US006584405B1

(12) United States Patent
Moncet

(10) Patent No.: US 6,584,405 B1
(45) Date of Patent: Jun. 24, 2003

(54) RADIANCE MODELING

(75) Inventor: Jean-Luc Moncet, Boston, MA (US)

(73) Assignee: Atmospheric and Environmental Research, Inc., Cambridge, MA (US)

( * ) Notice: Subject to any disclaimer, the term of this patent is extended or adjusted under 35 U.S.C. 154(b) by 0 days.

(21) Appl. No.: 09/565,807

(22) Filed: May 5, 2000

(51) Int. Cl.[7] ....................... G01W 1/00; G06F 169/00; G06F 19/00
(52) U.S. Cl. ....................... 702/3; 702/2; 702/4; 703/2; 703/9
(58) Field of Search .................. 702/2, 3, 4; 703/2, 703/9; 356/222, 343, 432, 3.01; 73/335.01

(56) References Cited

U.S. PATENT DOCUMENTS 5,884,226 A * 3/1999 Anderson et al. .............. 702/3

OTHER PUBLICATIONS

Wiscombe et al., "Exponential–Sum Fitting of Radiative Transmission Functions", Journal of Computational Physics 24, 1977, pp. 416–444.
Goody et al., "The Correlated–k Method For Radiation Calculations In Nonhomogeneous Atmospheres", J. Quant. Spectrosc. Radiat. Transfer, vol. 42, No. 6, 1989, pp. 539–550.
West et al., "Mapping Transformations For Broadband Atmospheric Radiation Calculations", J. Quant. Spectrosc. Radiat. Transfer, vol. 43, No. 3, 1990, pp. 191–199.
Lacis et al., "A Description of the Correlated κ Distribution Method for Modeling Nongray Gaseous Absorption, Thermal Emission, and Multiple Scattering in Vertically Inhomogeneous Atmospheres", Journal of Geophysical Research, vol. 96, No. D5, May 20, 1991, pp. 9027–9063.

Armbruster et al.,. "Improved Method of Exponential Sum Fitting of Transmissions to Describe the Absorption of Atmospheric Gases", Applied Optics, vol. 35, No. 12, Apr. 20, 1996, pp. 1931–1941.
Sun et al., "Improved Application of Exponential Sum Fitting Transmissions to Inhomogeneous Atmosphere", Journal of Geophysical Research, vol. 104, No. D6, Mar. 27, 1999, pp. 6291–6303.
Tjemkes et al., "Synthetic Satellite Radiance Using the Radiance Sampling Method", Journal of Geophysical Research, vol. 102, No. D2, Jan. 27, 1997, pp. 1807–1818.
McMillin et al., "Atmospheric Transmittance of an Absorbing Gas: A Computationally Fast and Accurate Transmittance Model for Absorbing Gases with Constant Mixing Ratios in Inhomogeneous Atmospheres", Applied Optics, vol. 15, No. 2, Feb. 1976, pp. 358–363.

(List continued on next page.)

*Primary Examiner*—John Barlow
*Assistant Examiner*—Stephen J. Cherry
(74) *Attorney, Agent, or Firm*—Fish & Richardson P.C.

(57) ABSTRACT

A spectrum is automatically searched to select monochromatic spectral points, monochromatic transmittances or radiances are automatically calculated at the selected monochromatic spectral points, for one or more viewing geometries and for non-homogeneous atmospheres belonging to an ensemble of non-homogeneous atmospheres, and a weighted sum of the monochromatic calculated transmittances or radiances is automatically determined. The individual spectral points are selected so that the weighted sum is representative of calculations of spectrally averaged transmittances or radiances for the viewing geometries and for any non-homogeneous atmosphere belonging to the ensemble, in spectral bands to which the selected spectral points belong. The weighted sum is used for computing transmittances or radiances in emitting or scattering atmospheres.

11 Claims, 7 Drawing Sheets

PROPOSED CHANGES

OTHER PUBLICATIONS

McMillin et al., "Atmospheric Transmittance of an Absorbing Gas. 2: A Computationally Fast and Accurate Transmittance Model for Slant Paths At Different Zenith Angles", Applied Optics, vol. 16, No. 5, May 1977, pp. 1366–1370.

McMillin et al., "Atmospheric Transmittance of an Absorbing Gas. 3: A Computationally Fast and Accurate Transmittance Model for Absorbing Gases With Variable Mixing Ratios", Applied Optics, vol. 18, No. 10, May 15, 1979, pp. 1600–1606.

Eyre et al., "Transmittance of Atmospheric Gases In The Microwave Region: A Fast Model", Applied Optics, vol. 27, No. 15, Aug. 1, 1988, pp. 3244–3249.

Eyre, "A Fast Radiative Transfer Model For Satellite Sounding Systems", Technical Memorandum No. 176, European Centre for Medium–Range Weather Forecasts, Mar. 1991.

* cited by examiner

RADIANCE MODELING

This invention relates to radiance modeling.

For the sake of simplicity, we limit the following background discussion to the modeling of up-welling radiances in a non-scattering terrestrial atmosphere bounded by a non-reflective surface and a single spectral observation (or channel). Let $\tau_v(z)$ represent the monochromatic transmittance at wavenumber v from top of the atmosphere (TOA) to an altitude z, $$\tau_v(z) = e^{-\int_z^{z0} \sum_m k_v^m(z) \rho^m(z) dz}, \qquad \text{Equation 1}$$

where the discrete summation is over the different absorbing gases, $k_v^m(z)$ is the pressure and temperature dependent absorption coefficient and $\rho^m(z)$ is the density of species m. The goal is to spectrally integrate the transmittances between TOA and a set of altitudes $\{z_l; l=1, \ldots, L\}$ over the interval $\Delta v$ of the measurement, $$\tau(z_l) = \int_{\Delta v} \phi_v \tau_v(z_l) dv, \qquad \text{Equation 2}$$

where $\phi_v$ represents the normalized spectral response of a given instrument channel (optional) which is assumed to vanish outside of the interval.

For most practical applications, a direct numerical evaluation of the integral in Eq. (2) from monochromatic transmittances specified Dn a fine uniform spectral grid, such as those used by reference line-by-line models, is prohibitive.

Several approximate techniques have been proposed in the literature to perform this integration in a computationally efficient manner. The first class of techniques include the k-distribution (e.g., Lacis and Oinas, 1991; Goody et al., 1989) and Exponential Sum Fitting of Transmission functions (ESFT) (Wiscombe and Evans, 1977) methods, originally developed for a single absorbing species in a single atmospheric layer at given temperature and pressure. These methods approximate the transmittance of a single gas as a finite sum of weighted exponential functions, $$\tau(u) = \int_v e^{-k_v u} dv \cong \sum_{i=1}^{N} w_i e^{-k_i u}. \qquad \text{Equation 3}$$

In Eq.(4), u represents the path integrated absorber amount, $$u = \int \rho z. \qquad \text{Equation 4}$$

The computational gain achieved with these approaches compared to the direct approach, originates from the non-monotonic nature of the molecular absorption spectrum and the fact that the value of the integral to the left of Eq. (3) is independent of the ordering of the k-values within the interval of interest. Elimination of the redundancy in the direct calculations is achieved by explicitly integrating over the probability distribution of k or by searching for a set of model parameters, $\{w_i, k_i\}$, that fits the transmittances evaluated for a range of values of u within a prescribed error threshold, as in the ESFT technique.

A number of approaches have been devised to apply the k-distribution and ESFT techniques to the treatment of non-homogenous atmospheres and gas mixtures (e.g. Lacis and Oinas, 1991; Goody et al., 1989; West et al., 1990; Armbruster and Fischer, 1996; Sun and Rikus, 1999). However, the use of simplifying assumptions limits the accuracy achievable with these proposed approaches and makes tuning and/or supervision a requirement for the model parameter generation. In addition, none of the proposed approaches addresses the full problem with the desirable characteristics that fitting errors monotonically decrease as the number of model parameters increase.

A second class of techniques for fast spectral integration of monochromatic transmittances includes the Frequency Sampling Method (FSM) or Radiance Sampling Method (RSM) (Tjemkes and Schmetz, 1997). Tjemkes and Schmetz attribute the limitations of the k-distribution method to the loss of wavenumber information during the generation of the model parameters and argue for the need to stay in wavenumber space. The FSM technique uses the following statistical estimator to approximate the integral of Eq. (2), $$\tau^*(z_l) = \sum_{i=1}^{N} \phi_{v_i} \tau_{v_i}(z_l), \qquad \text{Equation 5}$$

where the $v_i$'s are a set of arbitrarily selected wavenumbers within the interval spanned by the instrument function. For a given sampling strategy, the number, N, of samples used in the estimator controls the accuracy achieved with this method. This technique has the advantage that it is strictly monochromatic and that the effect of simultaneous absorption by the different gases and non-homogeneities in pressure and temperature are correctly accounted for. However, no criterion is used to objectively select the $v_i$'s and the method does not fully eliminate the redundancies in the line-by-line calculations which results in an excessive number of samples used to achieve a required accuracy.

A final class of technique widely used in remote sensing applications (McMillin and Fleming, 1975, 1977, 1979; Eyre and Woolf, 1988; Eyre, 1991) parameterizes the "effective optical depth" in each atmospheric layer as a function of atmospheric pressure, temperature and gas concentration, $$\log\left(\frac{\tau(z_l)}{\tau(z_{l-1})}\right) - \log\left(\frac{\tau^{ref}(z_l)}{\tau^{ref}(z_{l-1})}\right) = \sum_{k=1}^{P} a_k X_k, \qquad \text{Equation 6}$$

where $\tau^{ref}(z_l)$ represents the transmittance profile corresponding to a reference atmosphere, which can be computed exactly, and the $X_k$'s are functions of layer and path integrated (pressure weighted) temperature and gas concentrations. The weights $a_k$ are evaluated by least-square regression techniques to minimize the modeling error for an ensemble of globally representative atmospheric profiles ("training" set). This technique has the advantage that it requires the evaluation of only a single exponential to compute the transmittance for each atmospheric level and molecular constituent. However, the accuracy of the method depends largely on the choice of empirical basis functions and is difficult to control. Moreover, different parameterizations may be required to fit the transmission of highly variable constituents such as water vapor in different absorption regimes.

SUMMARY OF THE INVENTION

The Optimal Spectral Sampling (OSS) method is a rapid and accurate physical technique for the numerical modeling of narrow band transmittances in media with non-homogeneous thermodynamic properties (i.e., temperature and pressure) containing a mixture of absorbing gases with variable concentrations.

In general, the invention features a method in which a spectrum is automatically searched to select individual spectral points, monochromatic calculations of transmittance are obtained at the selected spectral points, and a weighted sum of the monochromatic calculated transmittances is determined. The individual spectral points are selected so that the weighted sum is essentially exactly representative of calculations of average transmittances in spectral bands to which the selected spectral points belong.

Implementations of the invention may include one or more of the following features. The transmittances may be accurately and rapidly numerically modeled with respect to media containing a mixture of absorbing gases with variable concentrations and non-homogenous thermodynamic properties. The selected spectral points in modeling radiances measured by Earth-orbiting down-looking radiometers can be applied to any spectral domain and instrument viewing geometry, and to the general problem of flux or radiance computation in emitting and scattering atmospheres.

The spectral points are selected to minimize RMS differences between exact and estimated transmittance profiles (or radiances) for a predetermined set of atmospheric profiles.

The spectral points may be selected based on a set of uniformly spaced monochromatic transmittances obtained from reference line-by-line calculations. Each spectral point may be selected by an iterative process of finding a spectral location that produces a minimal error among M possible locations. Weights for the respective points may be re-evaluated in each iteration.

The method has been specifically designed for the modeling of radiances measured by Earth orbiting down-looking microwave and infrared radiometers but can be applied to any spectral domain and instrument viewing geometry, and to the general problem of flux or radiance computation in emitting and scattering atmospheres. The OSS method is particularly well suited for remote sensing applications and for the assimilation of satellite observations in Numerical Weather Prediction models. Both applications require fast and accurate models to produce radiances and radiance derivatives used for the real-time determination of profiles of atmospheric temperature and constituents from multispectral satellite observations (the so-called "inverse" problem).

Other advantages and features will become apparent from the following description and from the claims.

DESCRIPTION

We first briefly describe the figures.

The OSS method is related to the ESFT technique, and is equivalent to the ESFT technique in the special case of a homogeneous atmosphere and a single constituent. The OSS method approximates the atmospheric transmittance in a given channel as a weighted sum of monochromatic transmittances evaluated at selected wavenumbers (nodes) within the interval spanned by the instrument function:

$$\tau(z_l) \cong \sum_{i=1}^{N} w_i \tau_{v_i}(z_l). \qquad \text{Equation 7}$$

In the OSS approach, the $v_i$'s and $w_i$'s are selected optimally in order to minimize the RMS difference between the exact and estimated transmittance profiles for a set s of atmospheric profiles chosen to span the range of conditions to which the model will be applied:

$$\varepsilon_N = \sum_s \left[ \tau^s(z_l) - \sum_{i=1}^{N} w_i \tau_{v_i}^s(z_l) \right]^2 \qquad \text{Equation 8}$$

Figure 1:
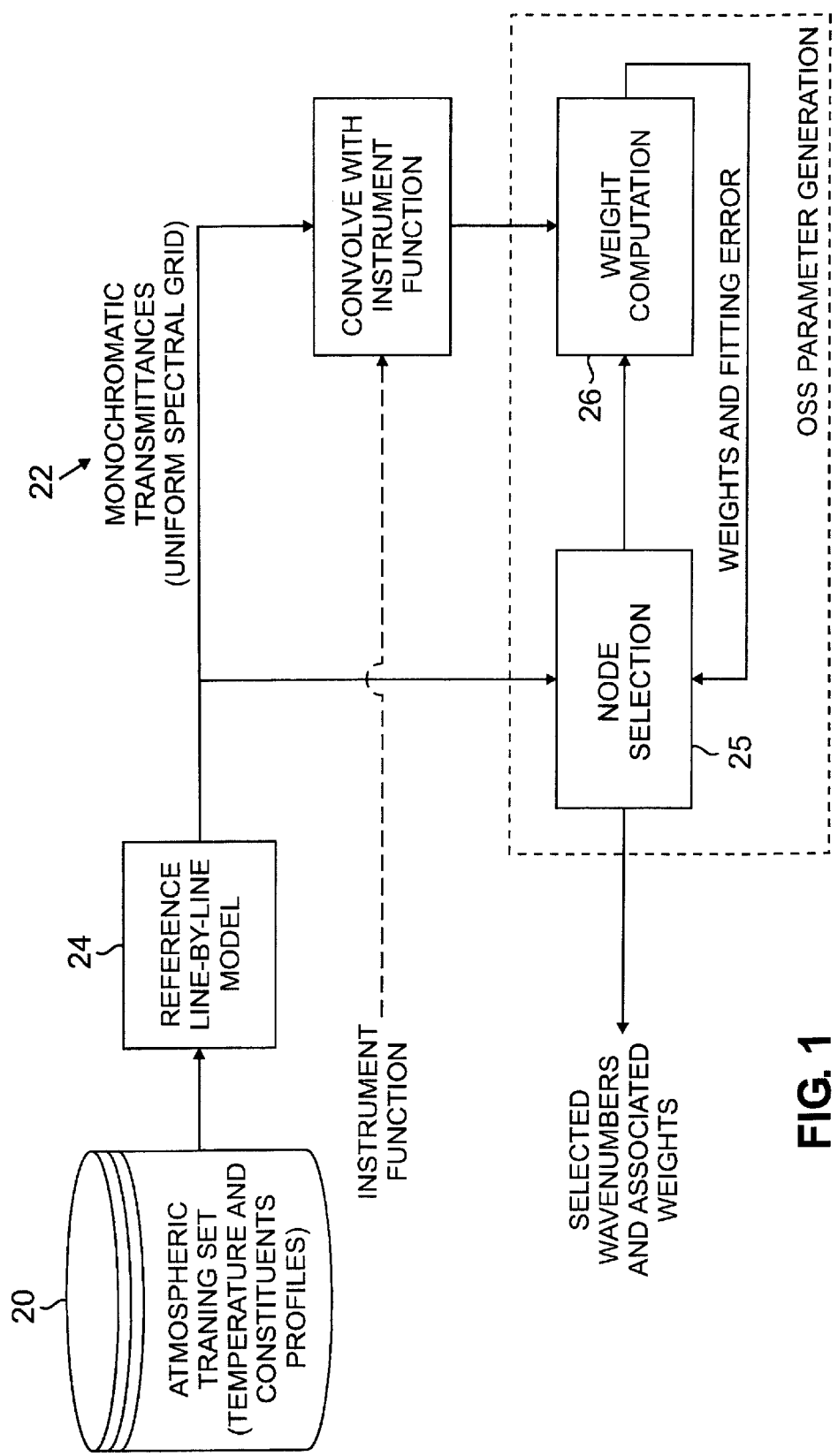
FIG. 1 is a functional diagram of an OSS coefficient generation algorithm.

FIG. 1 shows the flow diagram of the computational algorithm used to evaluate the model parameters for a given instrument channel (or spectral region). The training ensemble 20 used for OSS is identical to the one used in the third class of methods described above. For global applications, care should be taken to include an appropriate level of variability in all the active atmospheric constituents, including the minor constituents such as $CO_2$, $O_3$, $CH_4$, $CO$ and $N_2O$, in constructing the training ensemble. Temperature and water vapor profiles can easily be obtained from archived measurements from a global radiosonde network. Fewer measurements are available for the minor species. For these molecules, an alternative is to use samples of profiles produced by atmospheric chemistry models.

The optimal selection 25 of the $v_i$'s is done from the set 22 of uniformly spaced monochromatic transmittances, $\{\tau_{v_l}; l=1, \ldots, M\}$, obtained from reference line-by-line calculations 24.

Figure 2:
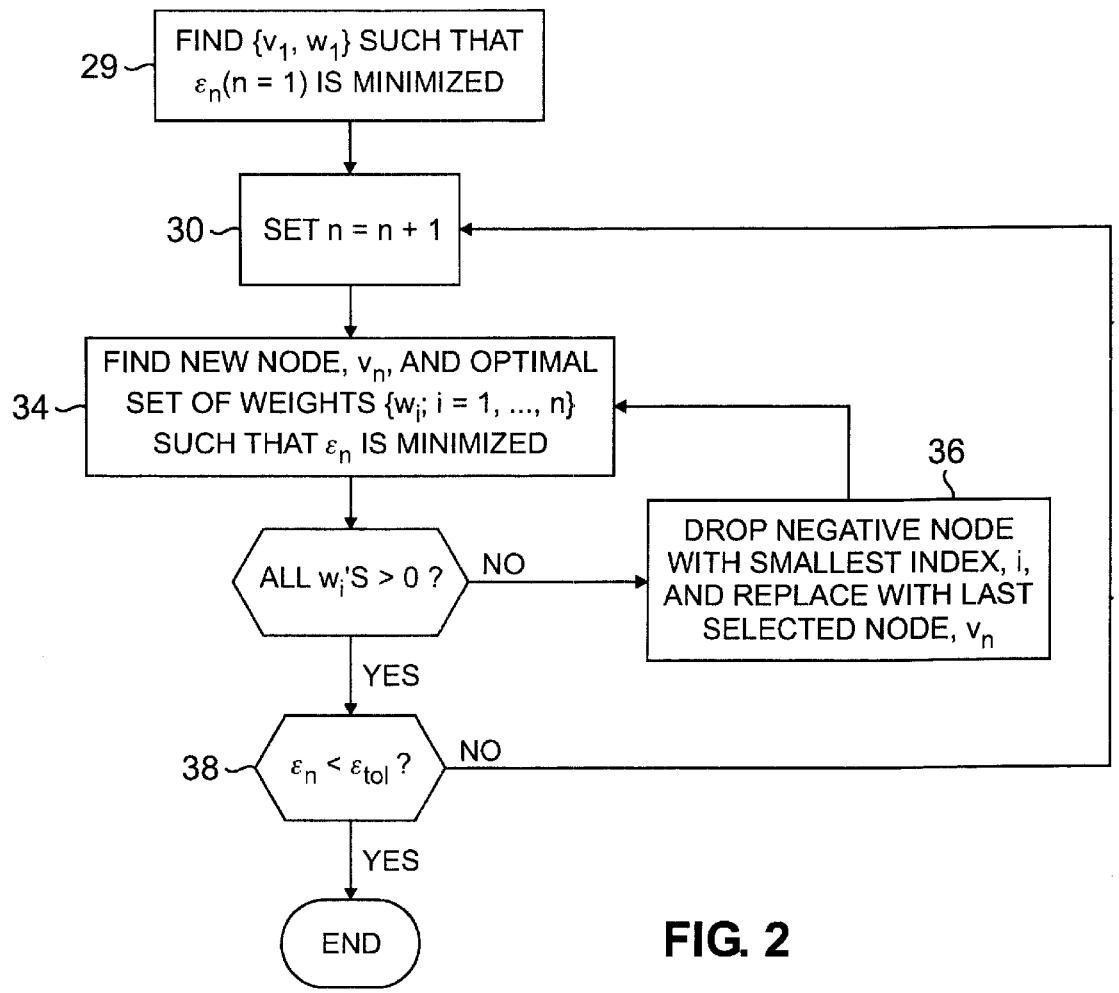
FIG. 2 shows a sequential search procedure for node selection.

Any standard search procedure can be applied. For a given combination of $v_i$'s, the weights may be obtained 26 by a linear regression procedure. One suggested approach for the optimal selection of the $v_i$'s (see FIG. 2) consists of starting with N=1 and searching (29) for the spectral location $v_l$ that produces the smallest error among the M possible locations. Once $v_l$ and its associated weight have been determined the fitting error is compared to a prescribed tolerance, $\epsilon_{tol}$. If $\epsilon_l \leq \epsilon_{tol}$ (38) the procedure stops. Otherwise, N is incremented by one (30) and the search for $v_N$ (34) proceeds in the same fashion. Note that the weights $w_1, \ldots, w_N$ need to be reevaluated for each trial combination. Occurrence of pairs of nodes with almost identical transmittance values can be the source of ill-conditioning in the solution system and produce negative weights. This situation is avoided by replacing the node with the lowest index associated with a negative weight with the last selected node (36) and restarting the search. This procedure is identical to the one described by Wiscombe and Evans (1977). The search procedure becomes time consuming when width of the interval $\Delta v$ is increased. In such cases it possible to divide the interval into smaller subintervals and apply the search to each subinterval independently. The width of the subintervals is then progressively increased and at each new step the search is confined to the previous node selection. In practice, it is useful to minimize the error in radiances instead of transmittance profiles. This provides a natural mechanism for improving the fit in the layers that contribute most to the observed radiances in any given spectral regions. It also accelerates the computation of the $w_i$'s.

The parameters produced with the OSS search procedure are intended for use as an input to a fast "forward" model which computes radiances (and derivatives) corresponding to a given atmospheric profile. The forward model must use pre-stored absorption coefficients for all optically active species obtained from line-by-line models and valid for the wave number location of the selected nodes. Pressure and temperature dependence of the molecular absorption can be taken into account by storing the absorption coefficient values for a set of pre-defined atmospheric layers and at air temperatures. The absorption coefficients for given environmental conditions are then derived by linearly interpolating the tabulated data. In certain problems, it is necessary to add water vapor as an entry to the tables. Radiance computation proceeds by first evaluating the total optical depth at each selected node by adding up the contributions from each molecule and by building profiles of transmittances between TOA and the top of each atmospheric layer according to Eq. 1. A standard monochromatic radiative transfer scheme can be used to evaluate the radiances at each node (see Appendix). The radiance in any given channel is then reconstructed by applying the appropriate weights to the monochromatic radiances and summing up the results (see Eq. 7).

The OSS approach can be implemented using a variety of software, hardware, and combinations of software and hardware.

The OSS approach has the advantages that an optimal solution to the problem of radiance modeling in a general atmosphere is produced and the model parameters are derived using a fully automated and unsupervised search procedure (no manual tuning is required). The OSS method uses desirable properties of other techniques. Like the FSM and RSM method, the OSS approach retains the spectral information, which results in a rigorous treatment of the atmospheric inhomogeneities and the gas mixtures. The introduction of weights in the parameterization, in a manner akin to the ESFT method, allows one to fully exploit the redundancy in the spectral calculations which results in a number of nodes that is generally much smaller (one or two orders of magnitude) than the one obtained with the RSM approach.

Additional advantages of the OSS approach compared to the widely used statistical models (third class) are:

1) In most spectral regions and for a same degree of accuracy, the radiative transfer calculations are computationally faster, especially when the gradient of the model is required.
2) The model accuracy can be improved simply by increasing the number of nodes.
3) The method provides a more accurate treatment of surface reflection effects in radiative transfer calculations.
4) The application of the model can be extended to scattering atmospheres.

Figure 3:
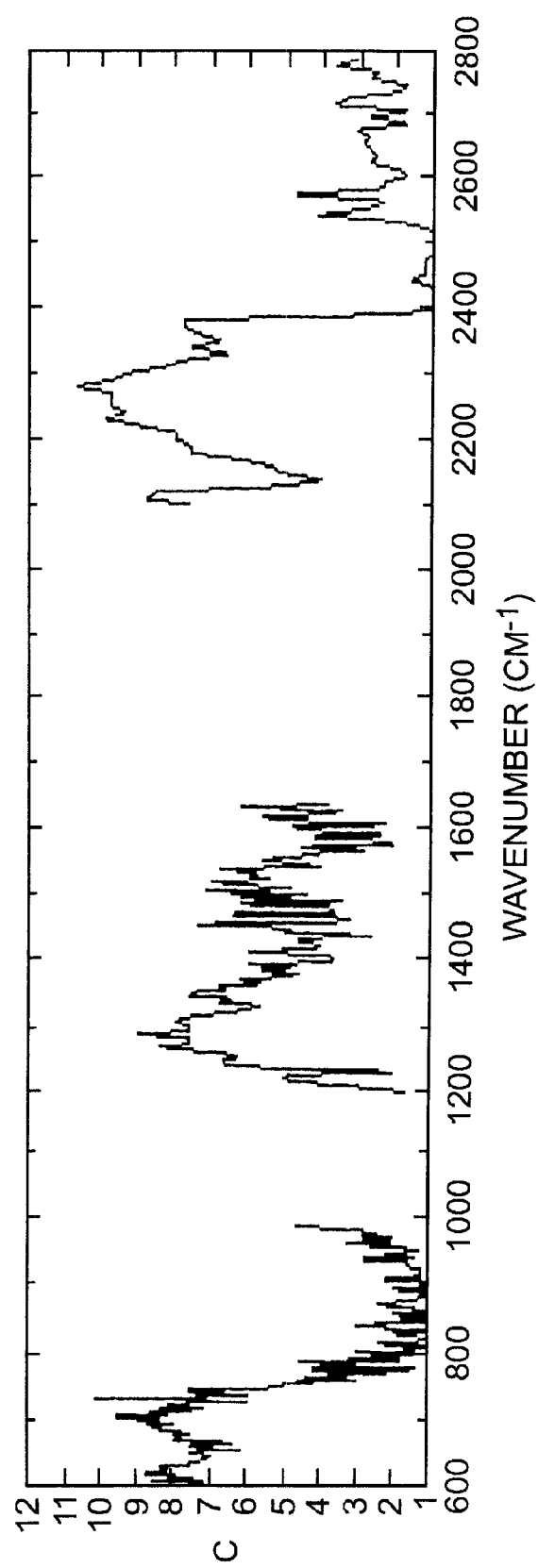
FIG. 3 shows a number of spectral nodes per channel for a notional infrared sounder.
Figure 4A:
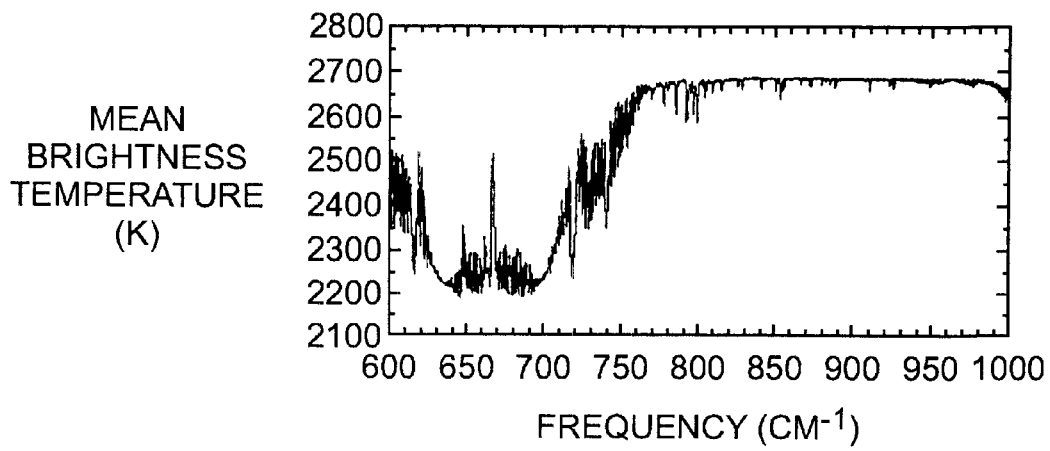
FIG. 4 shows a comparison of OSS radiances with line-by-line calculations in Band 1 (a) and Band 2 (b) of a notional infrared sounder.
Figure 4B:
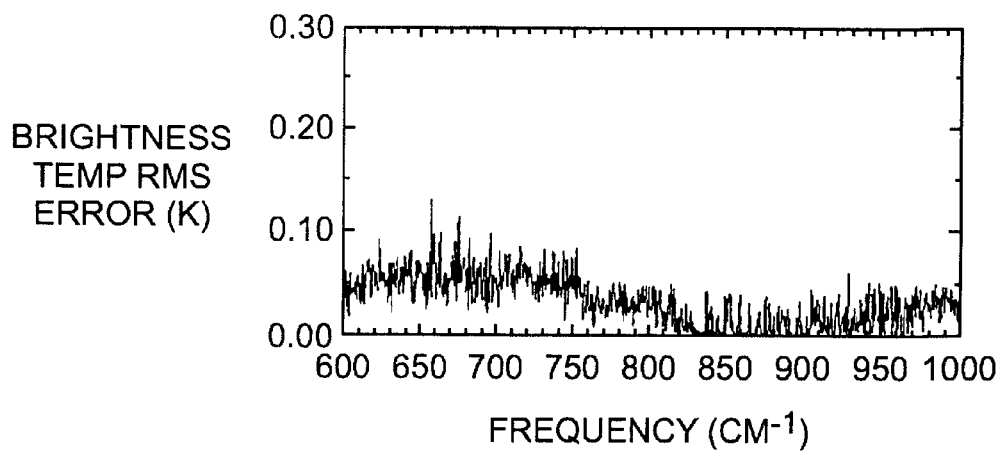
Figure 4C:
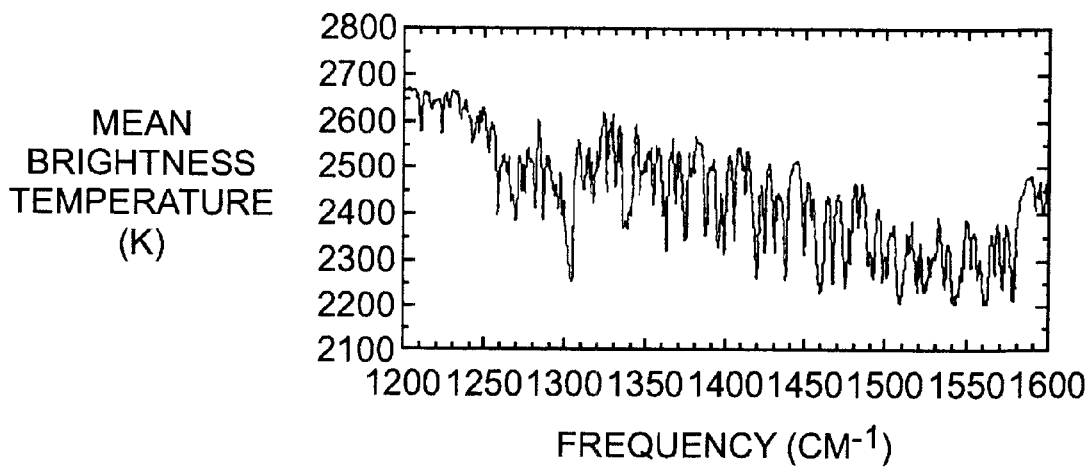
Figure 4D:
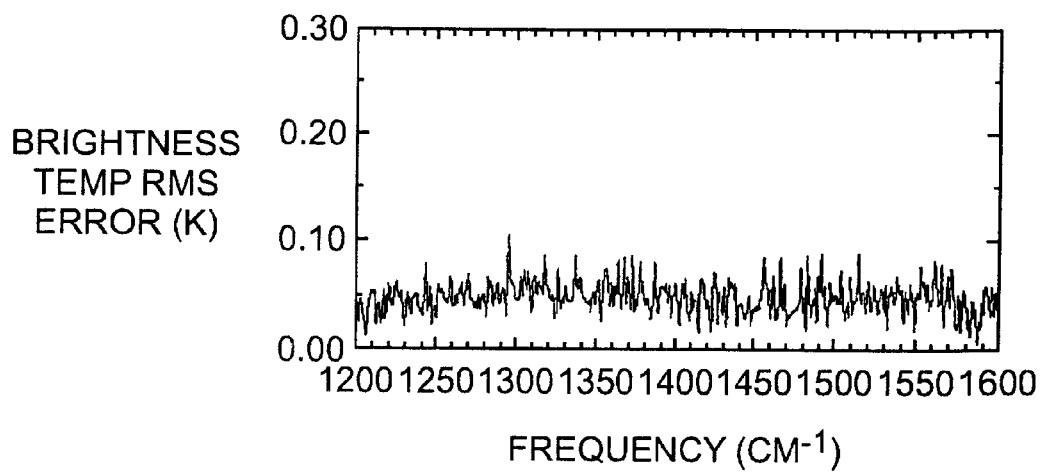

The following discussion provides two examples of application of the OSS technique. In the first example, the OSS approach is applied to the modeling of radiances observed by a notional high spectral resolution infrared sounder. The instrument is assumed to measure outgoing radiances from space in the following spectral bands: 600–1000 cm$^-$, 1200–1650 cm$^{-1}$ and 2100–2800 cm$^-$. In this example, a triangular instrument function is used. The width of the instrument function is 0.5 cm$^-$, 1 cm$^{-1}$ and 2 cm$^{-1}$ in Band 1, 2, and 3, respectively. FIG. 3 shows the number of nodes per channel obtained with the OSS procedure for a prescribed accuracy of 0.05 K in brightness temperature.

FIG. 4 shows the differences between the OSS radiances computed with the above selection and the reference line-by-line calculations for an independent set of 100 globally representative atmospheres. In this case, the sensor scan angle has been varied randomly between 0 and 60°. It is believed that the statistical models commonly used in remote sensing applications do not match OSS accuracy in Band 2 where the absorption by water vapor is dominant. The computational speed of the OSS based forward model has been compared to that of Eyre and Woolf's model for the processing of the three bands. When including the calculation of the derivatives of the radiances with respect to temperature and water vapor, the OSS forward model is about three times as fast as Eyre and Woolf's model. These comparisons were conducted on a SGI computer using a single RS 10000 processor.

Figure 5A:
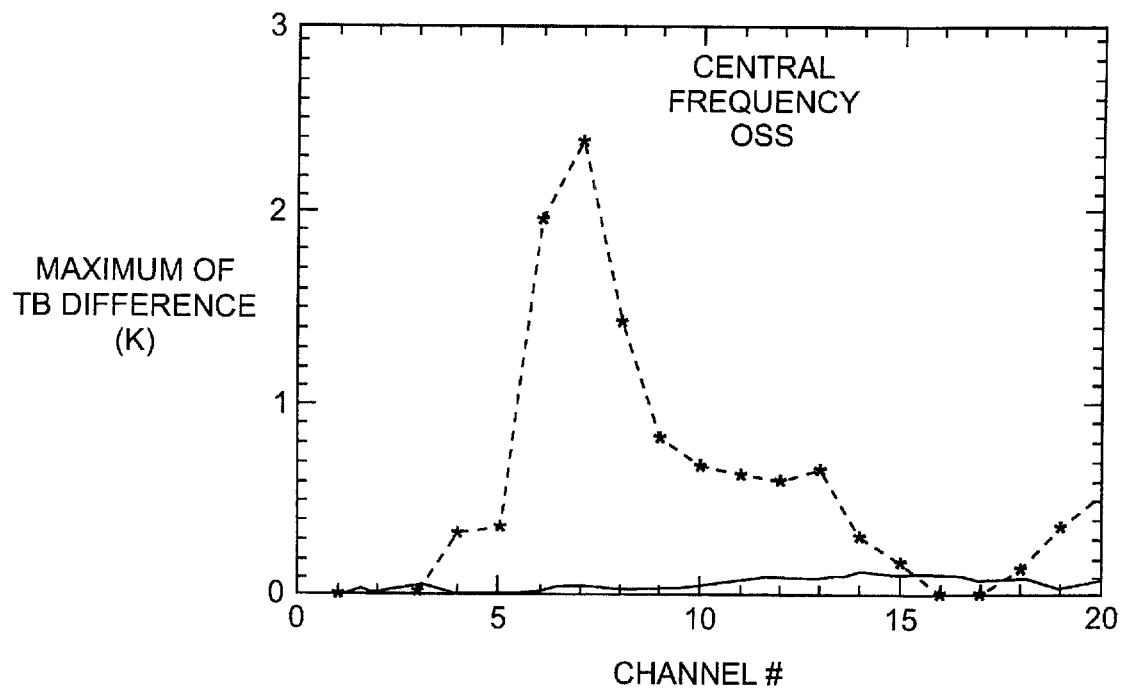
FIG. 5 shows comparison between OSS and "center frequency" methods for modeling of AMSU radiances. This figure shows the RMS (a) and maximum brightness temperature differences (b) between approximate radiances obtained with each model and reference line-by-line calculations.
Figure 5B:
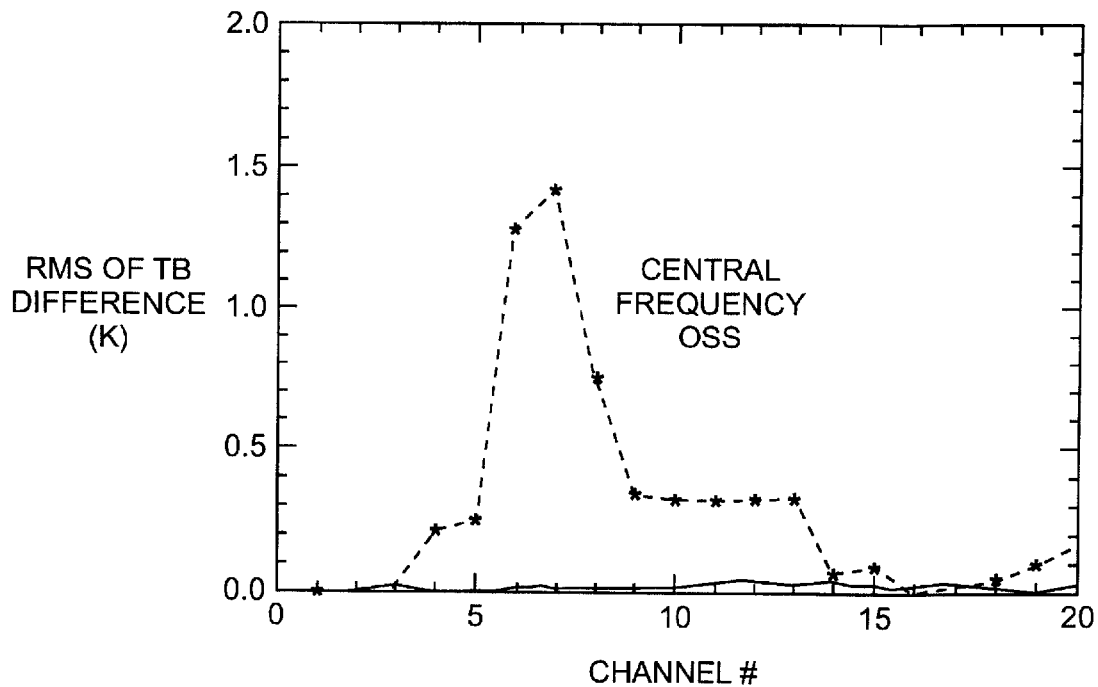

The second example addresses the modeling of microwave radiances. In this case, an Advanced Microwave Sounder Unit (AMSU) is used as a notional microwave sounder. The number of selected nodes in each AMSU channel is summarized in Table 1. FIG. 5 compares the accuracy of the OSS model to that of the commonly used "center frequency" method which uses a single node located at the center of each channel spectral band. The same set of 100 profiles was used for these calculations. The advantage of the OSS model over the "center frequency" method in terms of accuracy is most apparent in the temperature sounding channels (channel 4–14). The performance of Eyre and Woolf's model in this case (not shown) is comparable to that of OSS in the temperature channels. As in the previous example, Eyre and Woolf's model performs more poorly in the water vapor sounding channels (channel 15–20).

TABLE 1

OSS spectral node selection for AMSU channels

| Channel Number | Center Frequency (GHz) | Number of OSS Frequencies | RMS |
|---|---|---|---|
| 1 | 23.800 | 1 | 0.0009 |
| 2 | 31.400 | 1 | 0.0019 |
| 3 | 50.300 | 1 | 0.0060 |
| 4 | 52.800 | 3 | 0.0042 |
| 5 | 53.596 | 3 | 0.0049 |
| 6 | 54.400 | 3 | 0.0016 |
| 7 | 54.940 | 3 | 0.0263 |
| 8 | 55.500 | 3 | 0.0168 |
| 9 | 57.290 | 1 | 0.0188 |
| 10 | 57.290 | 3 | 0.0221 |
| 11 | 57.290 | 3 | 0.0310 |
| 12 | 57.290 | 3 | 0.0290 |
| 13 | 57.290 | 3 | 0.0258 |
| 14 | 57.290 | 3 | 0.0378 |
| 15 | 89.000 | 2 | 0.0006 |
| 16 | 89.000 | 2 | 0.0005 |
| 17 | 150.000 | 2 | 0.0025 |
| 18 | 183.310 | 2 | 0.0164 |
| 19 | 183.310 | 3 | 0.0066 |
| 20 | 183.310 | 3 | 0.0166 |

In particular implementation example for OSS, in a first pass, at any given wavenumber, the algorithm computes the profile of transmittance from space. The recursive procedure for the computation of radiances and analytical derivatives follows directly from equation 19 below.

1) Initialization: set $\Sigma_0^- = 0$.
2) If $(1-\epsilon_s)T_N > 10^{-4}$, add layers successively from TOA down to surface.

Update $\Sigma_l^-$ at each step and compute first part of radiance derivatives.

$$\left[\frac{\partial R}{\partial \tau_l}\right]_d = -\Sigma_{l-1}^- + \overline{B}_l T'_{l-1} \text{ and} \tag{1}$$

$$\left[\frac{\partial R}{\partial \Theta_l}\right]_d = \frac{\partial \overline{B}_l}{\partial \Theta_l}(T'_l - T'_{l-1}) \tag{2}$$

$$\Sigma_l^- = \Sigma_{l-1}^- + (T'_l - T'_{l-1})\overline{B}_l \tag{3}$$

3) Add the surface term and compute the derivative with respect to surface emissivity and temperature.

$$\frac{\partial R}{\partial \Theta_s} = T_N \epsilon_s \frac{\partial B_s}{\partial \Theta_s} \text{ and} \tag{4}$$

$$\frac{\partial R}{\partial \epsilon_s} = T_N B_s - \Sigma_N^- / (1 - \epsilon_s) \tag{5}$$

$$\Sigma_N^+ = \Sigma_N^- + T_N \epsilon_s B_s \tag{6}$$

4) Update $\Sigma_l^+$ by adding layers from surface up to TOA and compute the second part of derivatives.

$$\frac{\partial R}{\partial \tau_l} = -\Sigma_l^+ + \overline{B}_l T_l + \left[\frac{\partial R}{\partial \tau_l}\right]_d \text{ and} \tag{7}$$

$$\frac{\partial R}{\partial \Theta_l} = \frac{\partial \overline{B}_l}{\partial \Theta_l}(T_{l-1} - T_l) + \left[\frac{\partial R}{\partial \Theta_l}\right]_d \tag{8}$$

$$\Sigma_{l-1}^+ = \Sigma_l^+ + (T_{l-1} - T_l)\overline{B}_l \tag{9}$$

5) Set $R_v = \Sigma_0^+$ and compute the derivatives with respect to temperature and layer amounts for all molecular species.

$$\frac{\partial R_v}{\partial \omega_l^m} = \frac{\partial R_v}{\partial \tau_{v,l}} \times k_{v,l}^m; \quad m = 1, \ldots, M \tag{10}$$

Appendix: Monochromatic Radiative Transfer

Since the OSS method is a monochromatic approach to the radiative transfer, the gradient of the forward model with respect to all relevant atmospheric/surface parameters can be computed efficiently using an analytical scheme. Computation of radiances and derivatives with the OSS method uses a generic recursive scheme developed for the modeling of upward, downward-looking and limb-viewing instruments and used in atmospheric retrievals from CIRRIS [Miller el al., 1999].

Figure 6:
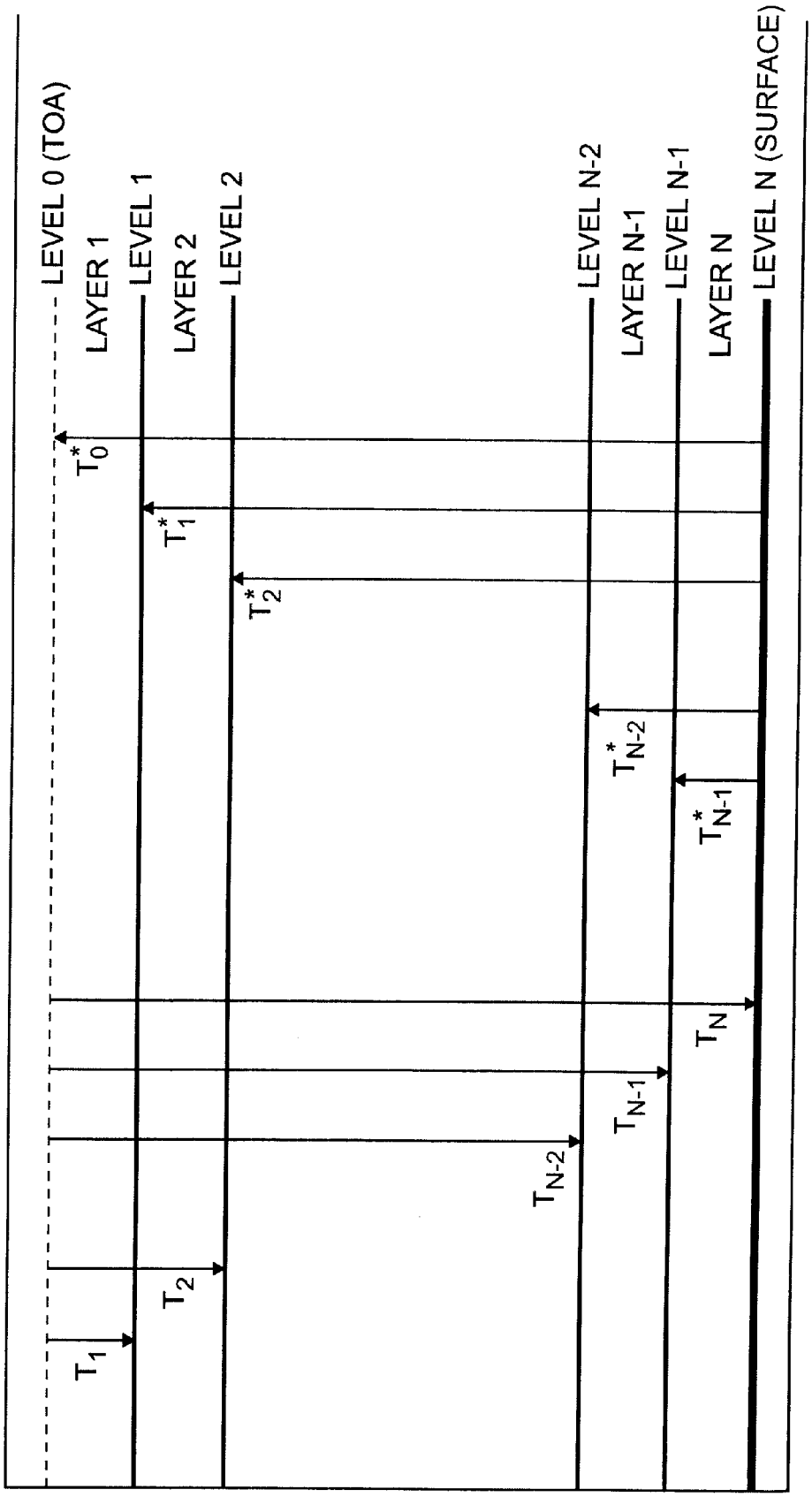
FIG. 6 is a schematic diagram showing the numbering convention for the atmospheric layers used by OSS, where T refers to transmittances, level 0 represents the top of the atmosphere (TOA) and level N the surface.

FIG. 6 defines the numbering conventions for the layered atmosphere. $T_l$ and $T_l^*$ denote the transmittances from space-to-level and surface-to-level 1 computed along the upward (u) and downward (d) atmospheric paths, defined as:

$$T_l = \exp\left(-\sum_{i=1}^{l} \tau_i^0 \sec\theta_{obs}\right) \tag{A1}$$

and:

$$T_l^* = \exp\left(-\sum_{i=l}^{N} \tau_{l+1}^0 \sec\theta_d\right) \tag{A2}$$

Radiance in clear conditions are computed using the following expression derived by discretizing the radiative transfer equation as:

$$R_v = \sum_{i=1}^{N}(T_{v,i-1} - T_{v,i})B_{v,i}^+ + \tag{11}$$

$$\epsilon_{vs}T_{v,N}B_{v,s}^+ + (1-\epsilon_{vs})T_{v,N}\sum_{i=1}^{N}(T_{v,i}^* - T_{v,i-1}^*)B_{v,i}^-$$

where $B_v^{\pm}$ represents the upward and downward Planck emission of the layer/surface and $\epsilon_{vs}$ is the surface emissivity.

Derivatives of $R_v$ with respect to constituent concentration or temperature in layer 1 are obtained by differentiating the previous equation:

$$\frac{\partial R}{\partial X_l} = -\frac{\partial \tau_l^0}{\partial X_l}\left\{\left[-T_l B_l + \sum_{i=l+1}^{N}(T_{i-1} - T_i)B_i + T_N \epsilon_s B_s + \right.\right. \tag{12}$$

$$(1-\epsilon_s)T_N \sum_{i=1}^{N}(T_i^* - T_{i-1}^*)B_i\right] \sec\theta_{obs} +$$

$$\left[-(1-\epsilon_s)T_N T_{l-1}^* B_l + (1-\epsilon_s)T_N \sum_{i=1}^{l-1}(T_i^* - T_{i-1}^*)B_i\right] \sec\theta_d\right\} +$$

$$\frac{\partial B_l^+}{\partial X_l}(T_{l-1} - T_l) + (1-\epsilon_s)T_N \frac{\partial B_l^-}{\partial X_l}(T_l^* - T_{l-1}^*)$$

or, by introducing the two-path attenuation from level 1 to space, $T'_l = (1-\epsilon)_s T_N T_l^*$:

$$\frac{\partial R}{\partial X_l} = -\frac{\partial \tau_l}{\partial X_l}\left[-T_l B_l + \sum_{i=l+1}^{N}(T_{i-1} - T_i)B_i + T_N \epsilon_s B_s + \right. \tag{13}$$

$$\sum_{i=1}^{N}(T'_i - T'_{i-1})B_i - T'_{l-1}B_l + \sum_{i=1}^{l-1}(T'_i - T'_{i-1})B_i\right] +$$

$$\frac{\partial B_l^+}{\partial X_l}(T_{l-1} - T_l) + \frac{\partial B_l^-}{\partial X_l}(T'_l - T'_{l-1})$$

where $X_l$ stands for either $\theta_l$ or $\omega_l^m$.

With the exception of the handling of the surface terms, the recursive procedure for the integration of the RTE and calculation of the derivatives over a reflective surface is similar to the one used for limb viewing. This procedure uses the fact that a perturbation in temperature or constituent concentration in any given layer of the atmosphere does not affect the emission in the atmospheric slab comprised between this layer and the observer. Therefore, derivatives can be obtained at low cost if the RTE is integrated by adding layers sequentially in the direction of the observer. The procedure is more apparent by introducing the quantities $\Sigma_l^-$ and $\Sigma_l^+$ defined as the contribution to the observed radiance of the downward emission (reflected at the surface) from the atmosphere above level 1 and the contribution of the atmosphere below level 1 plus reflected downward radiation, e.g.:

$$\Sigma_l^- = \sum_{i=1}^{l} (T_i' - T_{i-1}')B_i^- \quad (14)$$

and $$\Sigma_l^+ = \sum_{i=l+1}^{N} (T_{i-1} - T_i)B_i^+ + \varepsilon_s T_N B_s + \sum_{i=1}^{N} (T_i' - T_{i-1}')B_i^- \quad (15)$$

where (two-path transmittance):

$$T_l' = (1-\varepsilon_s)T_N T_l^* \quad (16)$$

Using the definitions of the previous equations, one can write:

$$\frac{\partial R}{\partial X_l} = \left(\left[\frac{\partial R}{\partial X_l}\right]\right)_u + \left(\left[\frac{\partial R}{\partial X_l}\right]\right)_d \quad (17)$$

$$= \left[\frac{\partial \tau_l}{\partial X_l}(-\Sigma_{l-1}^- + B_l^- T_{l-1}') + \frac{\partial B_l^-}{\partial X_l}(T_{l+1}' - T_l')\right] +$$

$$\left[\frac{\partial \tau_l}{\partial X_l}(-\Sigma_l^+ + B_l^+ T_l) + \frac{\partial B_l^+}{\partial X_l}(T_l - T_{l-1})\right]$$

In this example, the following simplifying assumptions are made in the calculation of the derivatives:

Dependence of atmospheric transmittances on temperature is neglected in the calculations of the derivatives:

$$\partial \tau_l / \partial \Sigma_l = 0 \quad (18)$$

Layer emission is computed as the average Planck emission for the layer:

$$B_l^+ = B_l^- = \bar{B}_l = (B_l^l + B_l^{l+u})/2 \quad (19)$$

This approximation is adequate as long as layers are not optically thick, e.g. the vertical pressure grid is sufficiently fine and no cloud is present. The trade-off between coarseness of the vertical sampling and the use of a more sophisticated approach such as linear-in-tau approximation has not been evaluated yet. It results from this approximation that $\partial B_l / \partial \tau_l = 0$.

What is claimed is:

1. A machine-based method comprising
  receiving spectra of monochromatic transmittances or radiances computed using a reference line-by-line model applied to a training ensemble of atmospheric conditions defined by vertical profiles of temperature, pressure, and concentration of optically active gases for one or more viewing geometries,
  automatically selecting monochromatic spectral points within a spectral range of the line-by-line model computations,
  automatically determining weights for selected spectral points so that the weighted sum of radiances or transmittances at the selected locations is optimally representative, to within any user-prescribed tolerance of error, of spectrally averaged transmittances or radiances computed from the reference line-by-line model, and
  providing the weights and properties of active gases at the selected spectral points tabulated as a function of pressure and temperature to a transfer model to compute averaged radiances or transmittances for an atmospheric condition and viewing geometry belonging to a domain encompassed by the training ensemble.

2. The method of claim 1 in which the transmittances or radiances are with respect to media with non-homogenous thermodynamic properties.

3. The method of claim 1 in which the transmittances or radiances are with respect to media containing a mixture of absorbing gases with variable concentrations.

4. The method of claim 1 also including using the selected monochromatic spectral points in modeling radiances measured by Earth-orbiting down-looking radiometers.

5. The method of claim 1 in which the selected monochromatic spectral points are used in connection with operation of a microwave sounder.

6. The method of claim 1 which the selected monochromatic spectral points are used in connection with operation of a high spectral resolution infrared sounder.

7. The method of claim 1 in which the monochromatic spectral points are selected to minimize RMS differences between exact and estimated transmittances profiles for a predetermined set of atmospheric profiles.

8. The method of claim 1 in which the monochromatic spectral points are selected to minimize RMS differences between exact and estimated radiances for a predetermined set of atmospheric profiles.

9. The method of claim 1 in which the monochromatic spectral points are selected based on a set of uniformly spaced monochromatic transmittances obtained from reference line-by-line calculations.

10. The method of claim 1 in which a monochromatic spectral point is selected by an iterative process of finding a spectral location that produces a minimal error among M possible locations.

11. The method of claim 10 in which weights are re-evaluated in each iteration.

* * * * *